US009323704B2

(12) United States Patent
Baba

(10) Patent No.: US 9,323,704 B2
(45) Date of Patent: Apr. 26, 2016

(54) ELECTRONIC DEVICE, ITS PAIRING PROCESS AND PAIRING MONITORING METHOD

(75) Inventor: Tsutomu Baba, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 13/248,256

(22) Filed: Sep. 29, 2011

(65) Prior Publication Data

US 2012/0089751 A1 Apr. 12, 2012

(30) Foreign Application Priority Data

Oct. 8, 2010 (JP) .................................. 2010-228154

(51) Int. Cl.
*G06F 13/14* (2006.01)
*G06F 13/38* (2006.01)
*G06F 21/70* (2013.01)

(52) U.S. Cl.
CPC .............. *G06F 13/385* (2013.01); *G06F 21/70* (2013.01)

(58) Field of Classification Search
CPC combination set(s) only.
See application file for complete search history.

(56) References Cited

U.S. PATENT DOCUMENTS

| 4,709,136 | A  | * | 11/1987 | Watanabe ...................... 235/379 |
| 4,882,752 | A  | * | 11/1989 | Lindman et al. .............. 713/166 |
| 4,951,249 | A  | * | 8/1990  | McClung et al. ................ 726/35 |
| 6,250,552 | B1 | * | 6/2001  | Hirasawa ...................... 235/475 |
| 6,325,540 | B1 | * | 12/2001 | Lounsberry et al. .......... 378/207 |
| 6,901,511 | B1 | * | 5/2005  | Otsuka .......................... 713/164 |
| 7,269,725 | B2 | * | 9/2007  | Cromer et al. ................ 713/100 |
| 2007/0198856 | A1 | * | 8/2007 | Lee et al. ...................... 713/190 |
| 2008/0034440 | A1 | * | 2/2008 | Holtzman et al. .............. 726/27 |
| 2009/0080621 | A1 | * | 3/2009 | Flukiger et al. ............... 378/207 |
| 2011/0079645 | A1 | * | 4/2011 | Henry ........................... 235/380 |
| 2012/0042099 | A1 | * | 2/2012 | Wong et al. ...................... 710/9 |
| 2014/0019364 | A1 | * | 1/2014 | Hurry et al. .................... 705/67 |

FOREIGN PATENT DOCUMENTS

JP  2008-077297  4/2008

* cited by examiner

*Primary Examiner* — Ilwoo Park
(74) *Attorney, Agent, or Firm* — Frommer Lawrence & Haug LLP

(57) ABSTRACT

An electronic device and its pairing process and pairing monitoring process is provided, which, though relatively simple, can correctly judge if the electronic device connected to a host device and multiple sub-devices is a certified pair so that the replacement by an illegal sub-device can be detected. An electronic device that implements the process according to the command from the host device has a control unit. The control unit controls the electronic device and multiple sub-devices. The sub-devices have reference data memory sections that store reference data specific to the sub-devices. The control unit has a comparing section that refers to the reference data of each of the multiple sub-devices.

11 Claims, 6 Drawing Sheets

ELECTRONIC DEVICE, ITS PAIRING PROCESS AND PAIRING MONITORING METHOD

The present application claims priority from Japanese Patent Application No. JP 2010-228154 filed on Oct. 8, 2010, the disclosure of which is incorporated herein by reference in its entirety.

FIELD OF THE INVENTION

The present invention relates to an electronic device which is connected to a host device and has multiple sub-devices, its pairing process and pairing monitoring method.

DESCRIPTION OF RELATED ART

In a system configured by a host device and an electronic device (lower device), which requires high security, multiple sub-devices are connected to the electronic device (lower device), and the function related to security is given to these sub-devices and a control unit of the electronic device (lower device) operates these sub-devices. A system that requires high security may perform a process to associate the electronic device (lower device) with the sub-devices and monitor if the electronic device (lower device) and the sub-devices are in a rightly paired relationship based on the association (pairing) in order to prevent an illegal sub-device, on which the security function does not work at all, from replacing the original sub-devices and being connected to the electronic device (lower device) to steal confidential information.

Also, in a data processing system having multiple devices which are connected to a host device and recognized as independent devices, the multiple devices are recognized as ones that collaborate together and are controlled to perform a series of operations so that the data specific to the devices is prevented from being artificially and mistakenly specified. (see Unexamined Japanese Patent Application Tokkai 2008-77297 ("JP 2008-77297"), for example). In the data processing system disclosed in JP 2008-77297, at least one of the multiple sub-devices, a device A, is provided with a memory means that stores specific data for distinguishing it from another device B, and a control means is provided to the host device to control the device A and the device B individually.

However, the pairing process and pairing monitoring process are generally very complicated in a system that require high security, and therefore, its processing system has to be structured with utmost care and attention. For this reason, a large amount of time and effort has to be spent on design, installation and function check in a conventional system.

Also, in a conventional system, the complicated pairing process/pairing monitoring process make each processing time longer, resulting in a less user-friendly system.

SUMMARY OF THE INVENTION

The present invention is devised considering the above problems; its objective is to provide an electronic device with a pairing process and pairing monitoring method that, though relatively simple, can correctly judge if the electronic device connected to a host device and multiple sub-devices are a certified pair and therefore can detect the replacement by an illegal sub-device.

To achieve the above objectives, the present invention provides as follows:

(1) An electronic device that performs processing according to commands from a host device, comprising: a control unit for controlling the electronic device; and multiple sub-devices controlled by the control unit; wherein each of the sub-devices has a reference data memory section which stores the reference data specific to the sub-device, and the control unit has a comparing section which refers to each of the reference data of the multiple sub-devices.

According to the present invention, each of the multiple sub-devices stores its specific reference data in the reference data memory section and the control unit which controls the sub-devices refers to the reference data. Therefore, it can be correctly judged whether or not the electronic device and the sub-devices are a certified pair, certainly detecting the replacement by an illegal sub-device.

Therefore, with a relatively simple pairing process/pairing monitoring method in the lower electronic device regardless of the system of the host device, the electronic device of the present invention can certainly detect the replacement by an illegal sub-device, preventing the illegal sub-device from being undetected and operated and therefore, preventing confidential information from being leaked.

(2) The electronic device wherein the control unit has a reference data creating section which creates the reference data specific to each of the multiple sub-devices, a memory unit which stores the reference data corresponding to each of the sub-devices, and a transmitting section which transmits the reference data to the reference data memory section of the corresponding sub-device; the comparing section collates the reference data stored in the reference data memory section with the reference data stored in the memory unit.

According to the present invention, the control unit of the electronic device creates the reference data, transmits the reference data to the sub-device and also stores in the control unit; therefore, there is no need to inject the reference data prior to attaching sub-devices to the electronic device. Thus, the usually complicated pairing process and pairing monitoring process can be simplified, reducing cost and effort spent on design, installation and function check of the system.

(3) The electronic device wherein the memory unit stores the data specific to the electronic device and the reference data creating section creates the reference data corresponding to each of the multiple sub-devices based on the data specific to the electronic device.

According to the present invention, the control unit of the electronic device can easily perform the pairing process by converting part of the data and/or rearranging the data of each sub-device based on the device-specific data.

(4) The electronic device wherein the control unit restricts the operation of the sub-devices when the results of the comparison at the comparing unit are unmatched.

According to the present invention, the operation of an illegal sub-device is restricted as soon as the control unit detects the illegal sub-device, so that the system is kept from being operated with the illegal sub-device undetected, thus preventing confidential information from being leaked. Note that the restriction of the operation of the sub-device includes the halt of the function of the electronic device by self-destruction.

(5) A pairing process that pairs an electronic device, connected to a host device and having a control unit for controlling the electronic device and also having multiple sub-devices controlled by the control unit, with each of the multiple sub-devices, wherein the control unit has a reference data creating step which creates the reference data specific to each of the multiple sub-devices, and a reference data injecting step which stores the reference data by corresponding to each sub-device and injects the reference data into the corresponding sub-device.

According to the present invention, the control unit of the electronic device creates the reference data and transmits the reference data to the sub-devices as well as stores it in itself; therefore, there is no need to inject the reference data prior to the attaching the sub-devices to the electronic device, thus simplifying the pairing process and pairing monitoring method which are usually more complicated, and reducing cost and effort spent on design, installation and function check of the system.

Therefore, even when the electronic device connected to a host device has multiple sub-devices, the pairing process of the present invention is able to pair the electronic device with each of the multiple sub-devices by a relatively simple pairing process in the electronic device (lower device), regardless of the system of the host device; therefore, it can certainly detects the replacement by an illegal sub-device.

(6) The pairing process wherein the reference data creating step creates the reference data when the control unit receives security data which is transmitted to each of the multiple sub-devices from the host device.

According to the present invention, the pairing is synchronized with the transmission of the security data from the host device to each of the multiple sub-devices so that the connections that require security are checked as the data transmission starts; therefore, the pairing process can be certainly performed on a genuine sub-device, certainly preventing the replacement by an illegal sub-device.

(7) A pairing monitoring method comprising, in the pairing process, a reference data reading step in which the control unit reads the reference data from each of the multiple sub-devices and a comparing step in which the control unit collates the reference data stored in the memory with the reference data that has been read.

According to the present invention, each of the multiple sub-devices stores its specific reference data in the reference data memory section and the control unit controlling these sub-devices refers to the reference data of each sub-device; therefore, it can be correctly judged at the control unit of the electronic device if the electronic device and each of the sub-devices are a certified pair, certainly detecting the replacement by an illegal sub-device.

Therefore, the pairing monitoring method of the present invention, regardless of the system of the host device, can certainly detect the replacement by an illegal sub-device with a relatively simple pairing process and pairing monitoring method in the lower device, preventing the illegal sub-device from being undetected and operated so that confidential information is kept from being leaked.

(8) The pairing monitoring method further comprising a step in which prior to the comparing step, the control unit judges whether or not the reference data is stored in each of the multiple sub-devices.

According to the present invention, the control unit judges prior to the comparing step whether or not the reference data is stored in each of the multiple sub-devices; therefore, it can be judged prior to the comparing step whether or not the pairing has been performed on the electronic device and each sub-device.

(9) The pairing monitoring method wherein the comparing step is provided with a operation-restricting step that restricts the operation of the multiple sub-devices when the reference data does not match any of the sub-devices.

According to the present invention, when the control unit detects an illegal sub-device, the operation of the sub-device is restricted, thus preventing the system from being operated while the illegal sub-device is still connected so that confidential information is prevented from being leaked. Note that the restriction of the sub-device also halts the function of the electronic device by self-destruction of the sub-device.

An electronic device, with the pairing process and pairing monitoring method of the present invention, though a relatively simple pairing process/pairing monitoring method, can correctly judge whether or not the electronic device connected to the host device and the multiple sub-devices is a certified pair, thus detecting the replacement by an illegal sub-device. Also, as soon as an illegal sub-device is detected, the function of the electronic device is halted by the operational restriction or the self-destruction of the illegal sub-device, thus preventing the system from being operated while the illegal sub-device is still connected so that confidential information is prevented from being leaked.

DETAILED DESCRIPTION OF EMBODIMENTS

Figure 1:
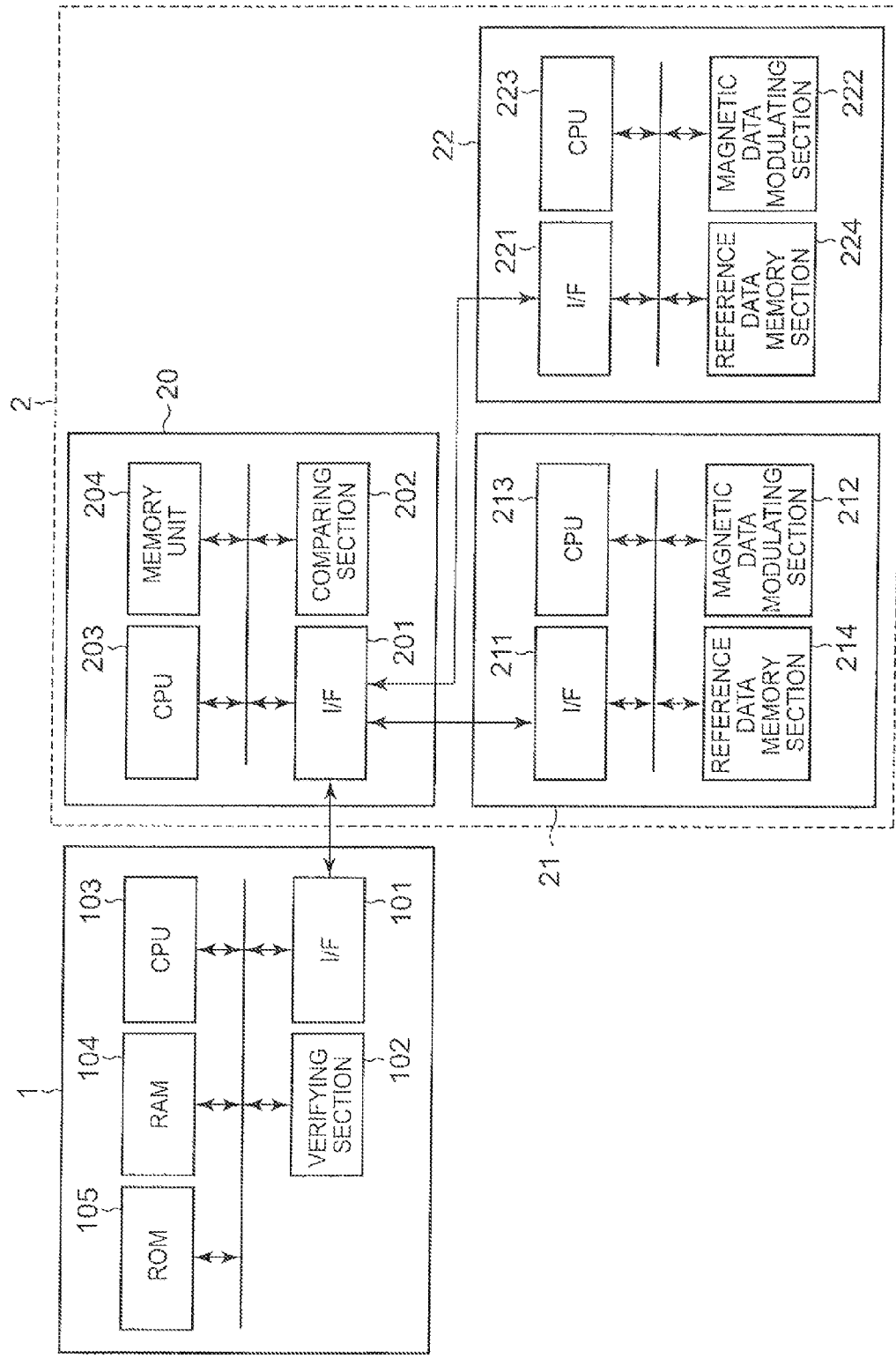
FIG. 1 shows an overall block diagram of an electrical configuration of an electronic device of an embodiment of the present invention.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An electronic device of the present invention is an electronic device 2 that performs processing according to the commands from a host device 1, and has a control unit 20 for controlling the electronic device 2 and multiple sub-devices 21, 22 controlled by the control unit 20; the sub-devices 21, 22 have reference data memory sections 214, 224 that store the reference data specific to the sub-devices 21, 22 and the control unit 20 has a comparing section 202 that refers to the reference data of each of the multiple sub-devices 21 and 22.

For the electronic device 2 that is a card reader for reading magnetic data on a magnetic stripe of a card with a magnetic head which is a sub-device and for transmitting the reading result, a technology called "encryption magnetic head" is recently utilized so that the magnetic data read by the magnetic head is immediately encrypted inside the magnetic head and the encrypted data is output to increase security protecting the data from eavesdropping and fraud at the time of magnetic data transmission to the host device 1. This encryption magnetic head is connected to a card reader control unit and performs processing according to the commands from the card reader control unit. Upon receiving a magnetic encrypting key data load command from the host device 1, the card reader control unit loads the key data to the encryption magnetic head. Then, the encryption magnetic head encrypts the magnetic data with the key data.

Also, among card readers that read magnetic data, there is a type in which two magnetic heads are arranged to be opposite to each other to enable magnetic reading on both sides of a card passage since the card reader cannot judge which way the card faces when inserted. When the above-mentioned encryption magnetic head is applied to a type of card reader that can perform magnetic reading on both sides of the card passage, two encryption magnetic heads are installed in the card reader. When such a configuration is applied to the present invention, the card reader corresponds to the electronic device 2 and the two encryption magnetic heads correspond to the sub-devices 21 and 22.

The present invention is described as it is applied in a card reader having two encryption magnetic heads as described above.

Figure 2:
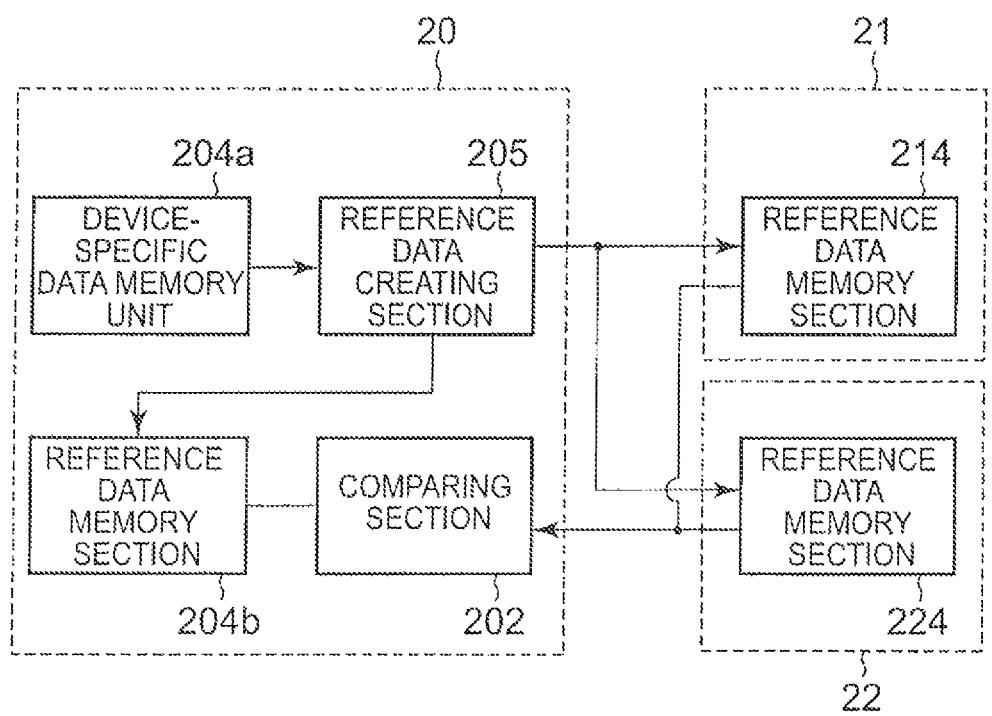
FIG. 2 shows a block diagram of the detailed pairing process and pairing monitoring process of the electronic device of the embodiment of the present invention.
Figure 3:
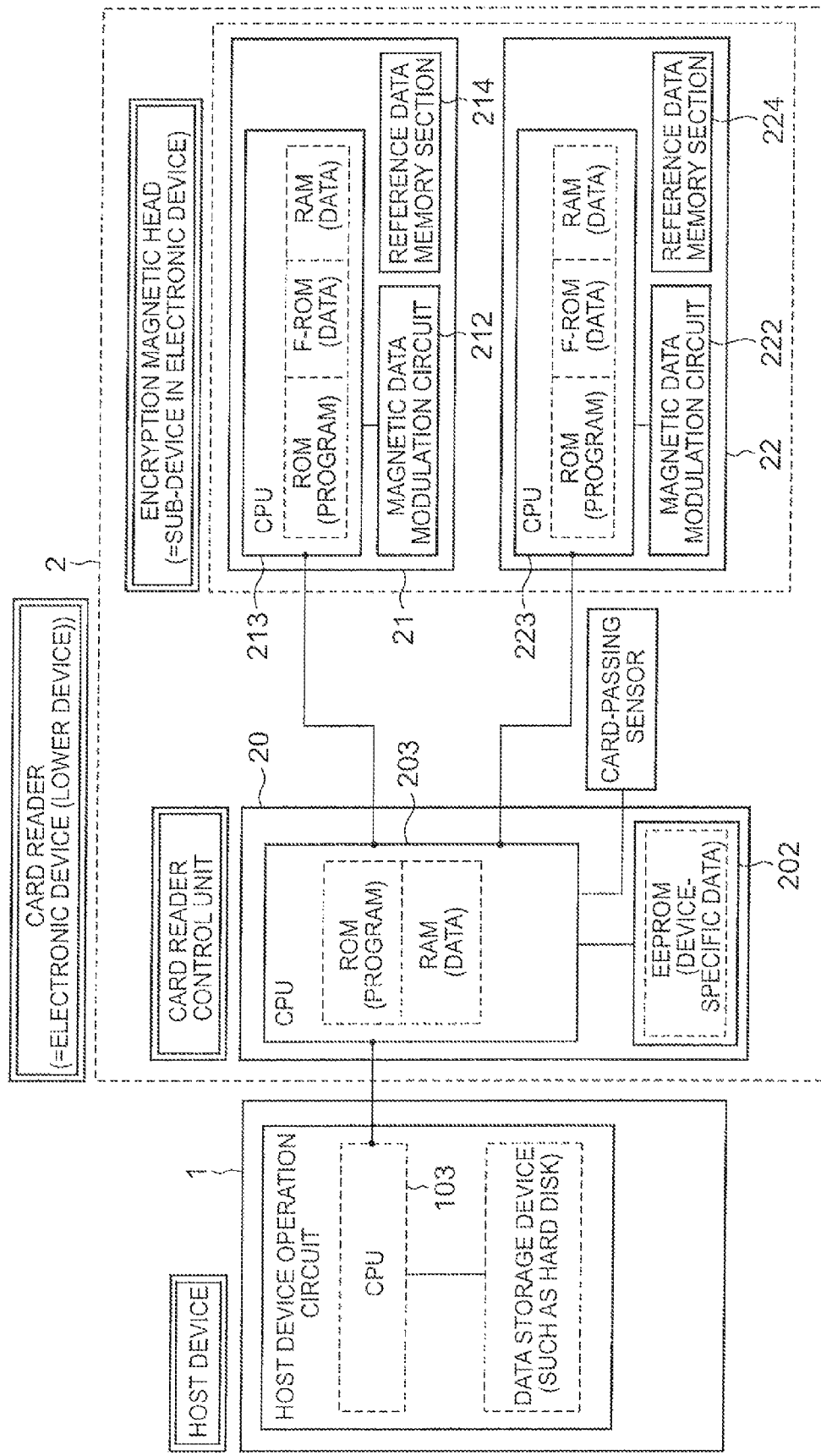
FIG. 3 shows a block diagram of an example of the configuration of the electronic device of the embodiment of the present invention.

Overall Configuration of System:

FIG. 1 is an overall block diagram of an electrical configuration of an electronic device of an embodiment of the present invention. FIG. 2 is a block diagram of the detailed pairing process and pairing monitoring process of the electronic device of the embodiment of the present invention. FIG. 3 is a block diagram of an example of the configuration of the electronic device of the embodiment of the present invention.

Referring to FIG. 1 and FIG. 3, the host device 1 is an ATM, for example. The electronic device 2 is a card reader which is connected to the host device 1. Also, the electronic device 2 has a first sub-device 21 and a second sub-device 22. The sub-devices 21, 22 are magnetic heads that read magnetic data on a magnetic stripe of a card, and are arranged to be opposite to each other on both sides of a card transport passage which is not shown to be able to magnetically read on both sides of the card passage.

Note that the sub-devices are not limited to the magnetic heads, but may be a combination of a magnetic head and an IC reader or of an IC reader and another device, or even a combination of three or more devices.

In FIG. 1, the host device 1 has an interface 101, an authenticating section 102, a CPU 103, a RAM 104 and a ROM 105.

The interface 101 provides interface with the control unit 20 of the electronic device 2 and has a connector or the like. Also, the interface 101 may use a serial bus interface such as a USB and an IEEE1394 or a cable, wireless or infrared data communication interface.

The authenticating unit 102 certifies the legitimacy of the sub-devices 21, 22 via the control unit 20. The authenticating unit 102 provides security data to the sub-devices 21, 22 to certify the legitimacy of the sub-devices 21, 22.

The CPU 103 implements programs stored in the ROM 105 using the RAM 104 as a work memory to control each section of the host device 1.

In FIG. 1 and FIG. 2, the control unit 20 of the electronic device 2 has an interface 201, a comparing section 202, a CPU 203, a memory unit 204 (a specific data memory section 204a and a reference data memory section 204b) and a reference data creating section 205.

The interface 201 provides interface between the host device 1 and the first sub-device 21 and the second sub-device 22, and has connectors. Also, the interface 201 may use a serial bus interface such as a USB and an IEEE1394 or a cable, wireless or infrared data communication interface.

The comparing section 202 performs the pairing (associating) and the pairing monitoring process between the first sub-device 21 and the second sub-device 22. The function of the comparing section 202 is described in detail later.

The CPU 203 performs a program stored in the memory unit 204 to control each section of the control unit 20. The memory unit 204 has a ROM, a RAM and the like.

In FIG. 1, the first sub-device 21 has an interface 211, a magnetic data demodulating section 212, a CPU 213 and a reference data memory section 214.

The interface 211 is an interface corresponding to the interface 201 of the control unit 20. The reference data memory section 214 stores the reference data specific to the sub-device. The CPU 213 performs a program stored in a memory which is not shown to control each section of the first sub-device 21.

The magnetic data demodulating section 212 decodes the magnetic data read by the magnetic head, which is the first sub-device, with a publicly-known means such as a binarizing process in order to make the data transmittable to the host device 1.

In FIG. 1, the second sub-device 22 has an interface 221, a magnetic data demodulating section 222, a CPU 223 and a reference data memory section 224. The configuration of each section is the same as that of the first sub-device 21.

Configuration of Pairing Process and Pairing Monitoring Process:

As shown in FIG. 2, the control unit 20 shown in FIG. 1 is mainly configured by the specific data memory section 204a, the reference data memory section 204b, the reference data creating section 205 and the comparing section 202.

The specific-data memory section 204a stores the data specific to the electronic device 2 hereinafter denoted as device-specific data. In this embodiment, the reference data creating section 205 creates the reference data corresponding to each of the sub-devices 21 and 22 based on the specific data stored in the specific-data memory section 204a. The reference data creating section 205 can create the reference data by converting part of the data or rearranging data for each sub-device based on the specific data. Note that it would be sufficient for the reference data creating section 205 to create the reference data respectively specific to the first sub-device 21 and to the second sub-device 22, and it may create each of the reference data by converting the timer value which the control unit 20 has, for example.

The control unit 20 stores the reference data, which is created in the reference data creating section 205, in the reference data memory section 204b by corresponding to each of the sub-devices 21 and 22, and transmits the reference data to the reference data memory sections 214 and 224 of the corresponding sub-devices 21 and 22. The reference data memory sections 214 and 224 store the reference data that has been received.

It is preferred that the control unit 20 create the reference data when receiving security data transmitted to each of the sub-devices 21 and 22 from the authenticating section 102 of the host device 1. At that time, the control unit 20 may combine the reference data with the security data and transmit the combined data to the sub-devices 21 and 22. The interface 201 shown in FIG. 1 configures the transmitting section which transmits the reference data to the reference data memory section 214, 224 of the corresponding sub-device 21, 22.

When shipped from the factory, the electronic device 2 is in a state where the pairing has not yet been performed and therefore the reference data has not been injected to the sub-devices 21 and 22. The pairing is performed when the electronic device 2 is connected to the host device 1 and the initial setting between the host device 1 and the electronic device 2 is performed.

Also, the comparing unit 202 reads the reference data from each of the reference data memory sections 214 and 224 of the sub-devices 21 and 22, compares it with the reference data stored in the reference data memory section 204b of the control unit 20. The comparing section 202 performs the comparison of the reference data regularly or irregularly (at the start-up of the electronic device, for example).

When the comparison of the reference data results in agreement in all of the corresponding reference data, the comparing section 202 judges that the sub-devices 21 and 22 are a certified pair, and the system moves to a normal operation mode. On the other hand, when any of the corresponding pairing data do not match, the comparing section 202 judges that the sub-devices 21 and 22 are not a certified pair and restricts the operation of the sub-devices 21 and 22.

When the comparison result at the comparing section 202 shows a disagreement, the control unit 20 may not only restrict the operation of the sub-devices 21 and 22 but may also issue a self-destruction order to the sub-devices 21 and 22 to make the sub-devices unrecoverable. Also, when the comparison result at the comparing section 202 shows a disagreement, the control unit 20 may not only restrict the operation of the sub-devices 21 and 22 but also causes a self-destruction to the electronic device 2 itself to make the device unrecoverable.

It is preferred that the comparing section 202 perform the pairing monitoring process regularly at a constant time interval in order to improve the efficiency of detecting an illegal device. Also, the control unit 20 may perform the comparison of the reference data at the comparing unit 202 when accessing the sub-devices 21 and 22 in order to improve the efficiency of detecting an illegal device.

Figure 4:
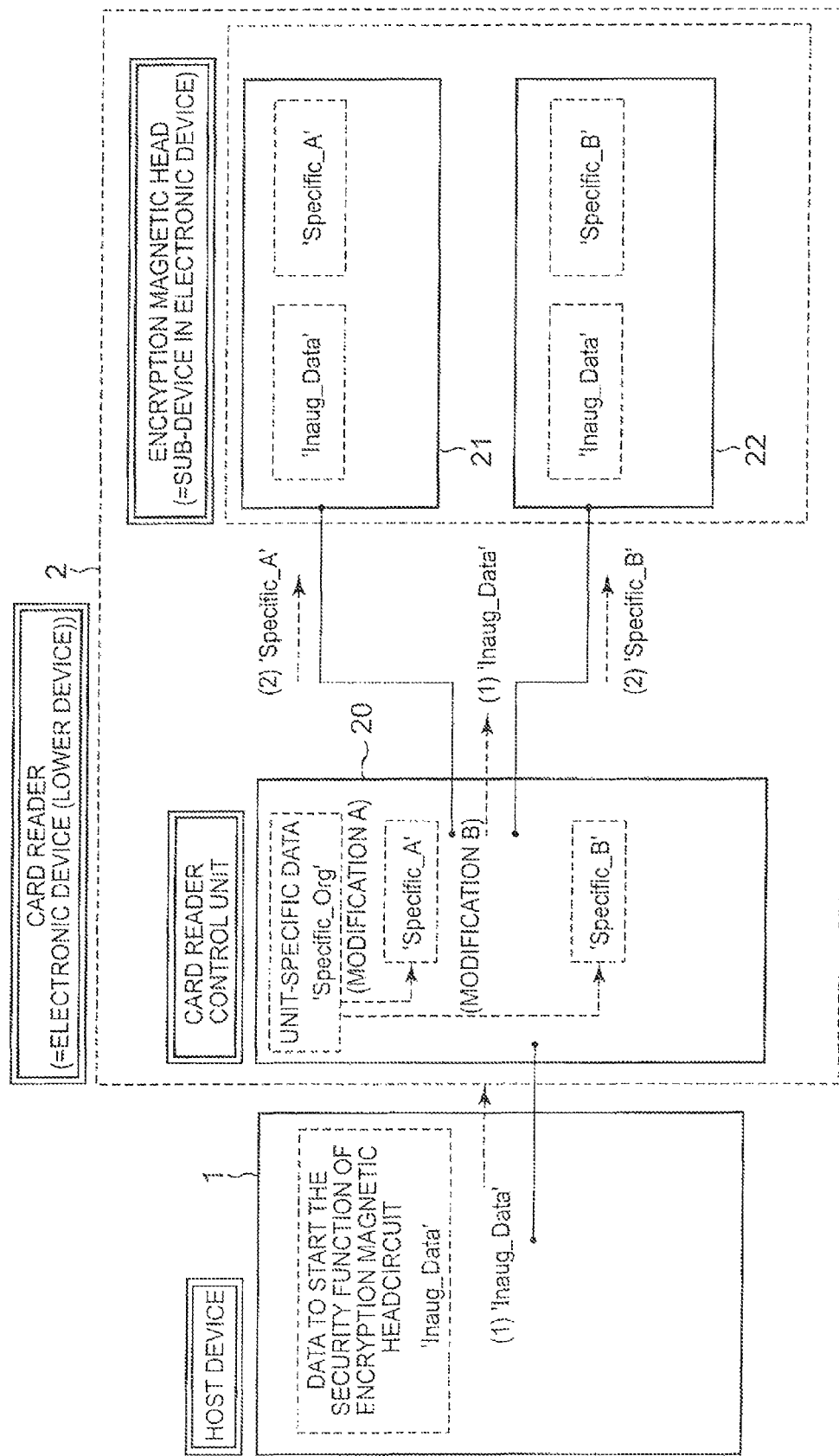
FIG. 4 shows a schematic diagram of the example of the process of the electronic device of the embodiment of the present invention of FIG. 3.
Figure 5:
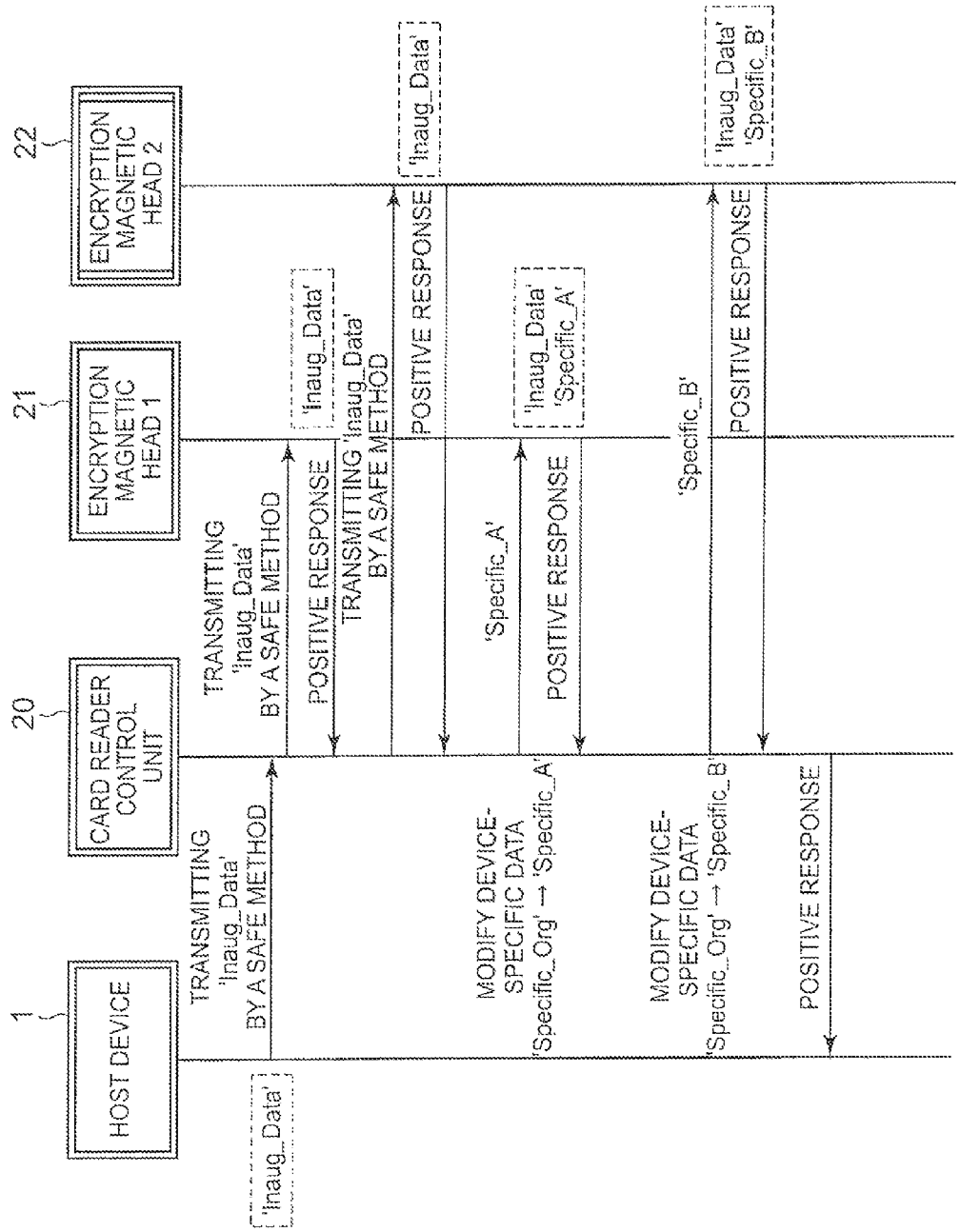
FIG. 5 shows a flow chart of an example of the pairing process.

Pairing Process:

Next, the step of the pairing process of the present invention is described. FIG. 4 is a schematic diagram showing an example of the pairing process of the present electronic device. FIG. 5 is a flow chart showing an example of the pairing process. Note that the numbers with circle in FIG. 4 indicate the order of the authentication process.

In the above-described configuration, the present invention can perform a relatively simple pairing process in the electronic device (lower device) no matter what kind of the host device system is used, by processing as follows:

The electronic device 2 is shipped out as in a state where the pairing has not yet been implemented to the sub-devices 21 and 22; at the stage of connection to the host device 1, the pairing is carried out to the sub-devices 21 and 22 when the host device 1 transmits security data to the sub-devices 21 and 22 via the electronic device 2. The electronic device 2 transfers the device-specific data stored in the specific data memory section 204a into proper forms corresponding to the sub-devices 21 and 22 to create the reference data specific to each of the sub-devices, and injects the data into the sub-devices 21 and 22.

The following paragraphs [1] and [2] describes the steps of the pairing process in more detail.

[1] The host device 1 injects to the both sub-devices 21 and 22 the security data 'Inaug_Data' which prompts the security function of the sub-devices 21 and 22 to start via the control unit 20 of the electronic device 2. The security data 'Inaug_Data' may be the data which the host device 1 uses for authenticating the sub-devices 21 and 22.

As shown in FIG. 5, the control unit 20 first injects the security data 'Inaug_Data' to the sub-device 21 and then injects the security data 'Inaug_Data' to the sub-device 22. With the successful injection of the security data 'Inaug_Data', the sub-devices 21 and 22 return a positive response to the control unit 20. Upon receiving a positive response from the both sub-devices 21 and 22, the control unit 20 judges that the injection of the security data 'Inaug_Data' was successful.

[2] When the injection of the security data 'Inaug_Data' to both of the sub-devices 21 and 22 was successful, the control unit 20 converts the device-specific data 'Specific_Org', which is stored in the device-specific data memory section 204a in advance, through predetermined processes corresponding to the sub-devices 21 and 22 respectively to create the reference data specific to the sub-devices respectively, and injects the corresponding reference data to the sub-devices 21 and 22.

As shown in FIG. 5, the control unit 20 first creates the reference data 'Specific_A' corresponding to the sub-device 21 and injects it to the sub-device 21, and then creates the reference data 'Specific_B' corresponding to the sub-device 22 and injects it to the sub-device 22. With the successful injection of the reference data, the sub-devices 21 and 22 return a positive response to the control unit 20. Upon receiving a positive response from the both sub-devices 21 and 22, the control unit 20 judges that the pairing process was successful and therefore returns a positive response to the host device 1. Note that the control unit 20 may simultaneously create the reference data respectively corresponding to the sub-devices and injects the data into each sub-device.

Figure 6:
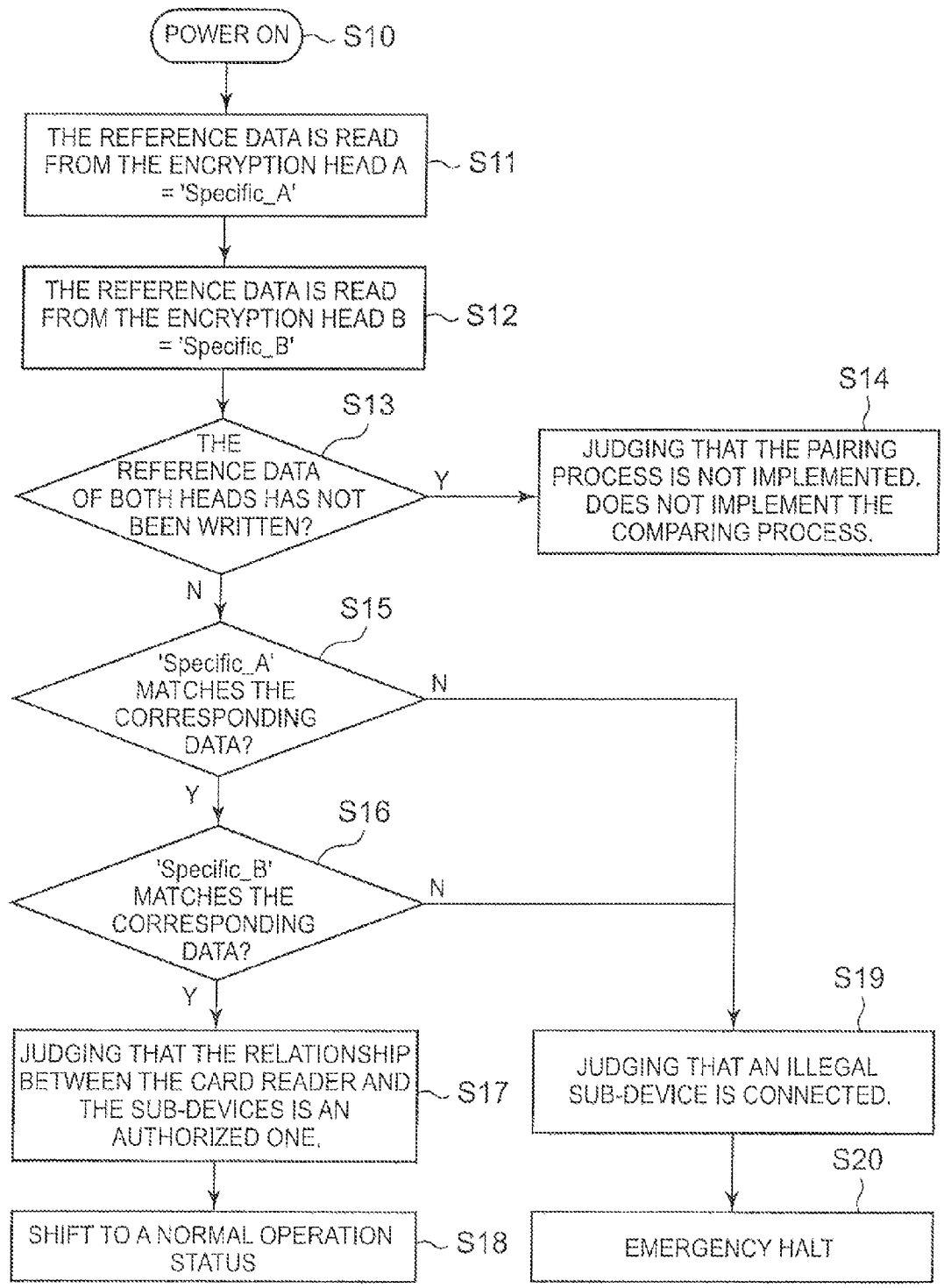
FIG. 6 shows a flow chart of an example of the pairing monitoring method.

Pairing Monitoring Method:

A process step of the pairing monitoring method of the present invention is described next. FIG. 6 is a flow chart showing an example of the pairing monitoring method.

After judging that the pairing process was successful, the control unit 20 reads the reference data from the sub-devices 21 and 22 at a predetermined interval for comparison. When the comparison shows that the reference data is different from what should have been read, the control unit 20 judges that the electronic device 2 and the sub-devices 21 and 22 are not a certified pair, and therefore, restricts the operation of the sub-devices 21 and 22 thereafter.

The detailed steps of the pairing monitoring process are described in paragraphs [3] through [5] hereinafter.

[3] When the electronic device 2 is turned on (S10), the control unit 20 reads the reference data from both the sub-devices 21 and 22 (S11, S12).

[4] When the reference data that has been read from both of the sub-devices 21 and 22 specifies the initial status (the status where the reference data is not written), it is judged that the pairing process has not been implemented and therefore the following comparison process is not implemented (S13, S14). At that time, the control unit 20 waits on the host device 1 for the command to inject the security data 'Inaug_Data' to the sub-devices 21 and 22.

[5] When the reference data that has been read from either one of or both of the sub-devices 21 and 22 does not specify the initial status (S13), the control unit 20 implements the reference data comparison process on the sub-devices 21 and 22 (S15, S16). When the reference data that has been read from both of the sub-devices 21 and 22 match the data that should be read originally, the control unit 20 judges that the sub-devices are in the certified pair, and therefore lets the system enter the normal operation mode (S17, S18).

On the other hand, when the reference data that has been read from both of the sub-devices 21 and 22 does not match the data that should be read originally, the control unit 20 judges that the sub-devices are not the certified pair, and therefore halts the function of the electronic device 2 thereafter (S19, S20).

In the electronic device 2, the sub-devices 21 and 22 are to be replaced as a set when they need to be replaced for maintenance. In doing so, this system takes the same step as [4] when the electronic device 2 is turned on after the sub-devices 21 and 22 are replaced; therefore, as the process after the above-described step [1] is implemented in succession by the command from the host device 1, the pairing is performed to the electronic device 2 and the sub-devices 21 and 22.

In the sub-devices 21 and 22, the initial status of the reference data is the condition where the reference data has not been written yet, in which the initial value such as "0" or "F" is written in for all the values. However, the present invention is not limited to this, but the initial status may be the condition where the same number value is written for all the values.

INDUSTRIAL USABILITY

Though being relatively simple, the electronic device, its pairing process and pairing monitoring process of the present invention can correctly judge whether the relationship between the electronic device connected to a host device and the multiple sub-devices is a certified one; thus, it is useful to detect the replacement by an illegal sub-device.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

DESCRIPTION OF CODES

1 Host device
2 Electronic device
20 Control unit
21 First sub-device
22 Second sub-device
102 Authenticating section
103 CPU
202 Comparing section
203 CPU
204 Memory unit
21 CPU
214 Reference data memory section
223 CPU
224 Reference data memory section

What is claimed is:

1. An electronic device configured to perform processes according to commands from a host device that has a CPU and a communication interface, the electronic device comprising:
    a control unit for controlling said electronic device; and
    multiple sub-devices which are provided in the electronic device, and are controlled by said control unit;
    wherein each sub-device has a reference data memory section that stores reference data specific to said sub-device;
    wherein said control unit has a comparing section; and
    wherein said control unit is configured to restrict the operation of said sub-devices when a comparison result of said comparing section does not match;
    wherein said control unit includes:
        a reference data creating section that creates the reference data specific to each of said multiple sub-devices in response to said electronic device receiving security data, from the host device, that is to be transmitted to each of said multiple sub-devices;
        a memory unit that stores said reference data corresponding to each sub-device; and
        a transmitting section that transmits said reference data to said reference data memory section of said corresponding sub-device; and
    wherein said comparing section compares the reference data stored in said reference data memory section with the corresponding reference data stored in said memory unit; and
    wherein said reference data specific to a sub-device is different from that of another sub-device.

2. The electronic device as set forth in claim 1;
    wherein said memory unit stores data specific to said electronic device; and
    wherein said reference data creating section creates the reference data corresponding to each of said multiple sub-devices based on said device-specific data.

3. The electronic device as set forth in claim 1;
    wherein the electronic device includes a card reader that connects with an ATM and reads magnetic data on a magnetic stripe of a card.

4. The electronic device as set forth in claim 3;
    wherein the multiple sub-devices include two magnetic heads arranged to be opposite to each other to enable magnetic reading on both sides of a card.

5. The electronic device as set forth in claim 3;
    wherein the control unit restricts the operation of all said multiple sub-devices when a mismatch of reference data for any one of said multiple sub-devices is determined.

6. A pairing method of paring an electronic device with multiple sub-devices of the electronic device, the electronic device being connected to a host device that has a CPU and a communication interface, the method comprising:
    a reference data creating step in which said electronic device creates reference data specific to each of said sub-devices; and
    a reference data injection step in which said electronic device:
        stores the reference data corresponding to each sub-device in a memory unit of the electronic device; and
        injects the specific reference data to each corresponding sub-device;
    wherein said reference data creating step creates said reference data in response to said electronic device receiving security data, from the host device, that is to be transmitted to each of said multiple sub-devices; and
    wherein said reference data specific to a sub-device is different from that of another sub-device.

7. The pairing method as set forth in claim 6, further comprising:
    a reference-data reading step in which said electronic device reads the reference data from each of said multiple sub-devices; and
    a comparing step in which said electronic device compares the reference data in the memory unit of the electronic device with the reference data that has been read from each of the multiple sub-devices.

8. The pairing method as set forth in claim 7, further comprising:
    a judging step in which the electronic device judges whether or not the reference data is stored in each said multiple sub-device prior to said comparing step.

9. The pairing method as set forth in claim 7;
wherein said comparing step includes an operation-restricting step that restricts the operation of all said multiple sub-devices when a mismatch of reference data for any one of said multiple sub-devices is determined.

10. The pairing monitoring process method as set forth in claim 7, further comprising:
receiving security data from the host device;
creating the reference data specific to each of said sub-devices by combining the security data with device data specific to each of the multiple sub-electronic devices.

11. The pairing process method as set forth in claim 6, further comprising:
receiving security data from the host device;
creating the reference data specific to each of said sub-devices by combining the security data with device data specific to each of the multiple sub-electronic devices.

* * * * *